Nov. 9, 1965 A. LIBOW 3,216,113

MICRO-MICROMETRIC TRANSLATOR

Filed Jan. 8, 1963

INVENTOR.
ALBERT LIBOW

BY Harold Becker

AGENT

United States Patent Office 3,216,113

Patented Nov. 9, 1965

1

3,216,113

MICRO-MICROMETRIC TRANSLATOR

Albert Libow, Brooklyn, N.Y.
(163—17 130th St., Jamaica, New York, N.Y.)

Filed Jan. 8, 1963, Ser. No. 250,130
2 Claims. (Cl. 33—1)

This invention relates to a micrometric translator. More particularly it relates to means of translating, moving or rotating an object through an ultra minute distance.

In examination of objects under a microscope or in crystallographic studies of compounds under X-rays or in collimators or in examination of objects under the electron microscope or the spectroscope it is frequently desirable to move the object or collimator linearly on the field or stage, or angularly about the axis of the object or spherically on a spherical plane. For this purpose micrometric means have been manufactured which have the function of transulating or moving the object linearly in a horizontal plane by means of a mechanical stage angularly by means of a protractor and spherically by means of a goniometer. Similar devices have been used in machine tools to move the work table or the tool holding compound through small increments. Devices of this nature have also been used in the servo mechanisms of guidance systems of missiles and orbital satellites.

An object of this invention is to provide a device capable of moving an object in a desired linear distance determinable in decimillionths of an inch.

Another object of this invention is to provide a device capable of rotating an object about its axis through a determinable ultra minute fraction of a second.

Other objects and purposes of this invention will become apparent to persons acquainted with this type of equipment upon reading the following specification and reference to the accompanying drawings which, by way of example, show an embodiment of my invention.

Figure 1:
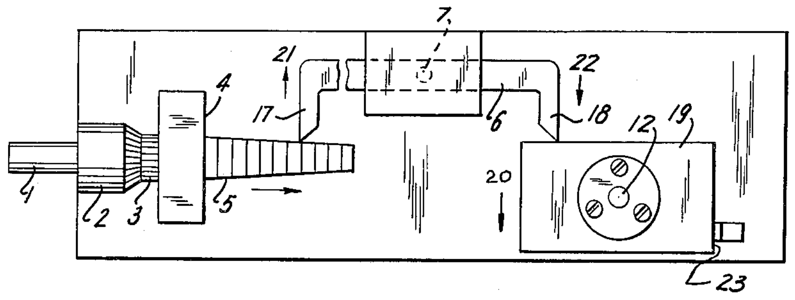
FIGURE 1 shows a plan view of my invention.
Figure 2:
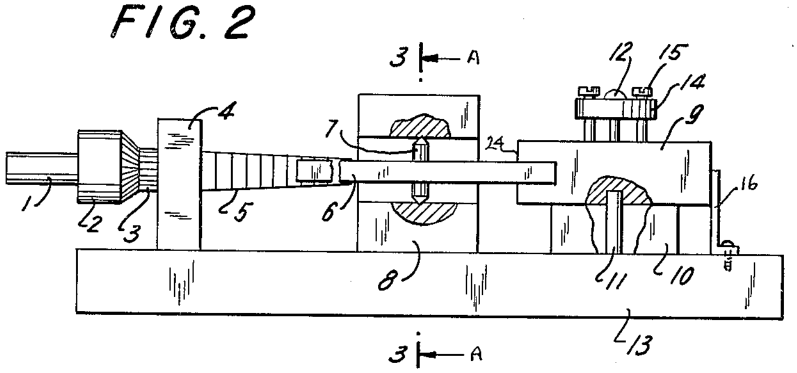
FIGURE 2 shows a side view of FIGURE 1.
Figure 3:
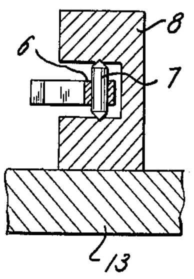
FIGURE 3 is a fragmentary section of FIGURE 2 along A—A.

Referring to the figures, a base 13 has mounted thereon a block 4. Through a threaded hole in the block 4 is mounted a micrometer. The sleeve 3, marked with 40 lines to the inch corresponds to the number of threads on the spindle 5 which is concealed in the thimble 2. The projecting end of the spindle 5 is conical in shape, having a $\frac{1}{1000}$ of an inch taper to one inch length of the spindle. The face of the cone is graduated in 100 divisions to the inch.

Mounted further on the base 13 is a U shaped support 8. Inside the legs of the U is mounted a U shaped arm 6 which has a pair of legs, 17 and 18 respectively. Through the arm 6 is a double pointed pivot 7 which pivots in recesses in the legs of the support 8. The leg 17 contacts the face of the conical spindle 5 so that the leg 17 rotates about its axial pivot 7 as the spindle is moved forward by turning the thimble 2 about its axis clockwise. Spherical balls may be used in conical bearing cavities instead of the pointed pivot. The pivot can be positioned in any desired position in the arm either centrally thereto or in such a location that the arm is longer on one side of the pivot than the other, thereby setting up an arm ratio.

2

Mounted further on the base 13 is a block 10 which has therein a vertical shaft 11 the top of which enters a hole in a rectangular block 9. The block 9 is capable of rotating in a horizontal plane about the shaft 11. The leg 18 of the U shaped arm 6 contacts a face 19 of the block 9. Forward motion of the spindle 5 causes the leg 17 to move toward 21, thereby moving the leg 18 toward 22, causing the block 9 to rotate toward 20 about the axial shaft 11. A spring 16 exerts pressure on the face 23 to assure contact of face 19 with the leg 18.

Mounted on the top face of block 9 is a stage 14 on which is placed the object 12 to be moved for examination or for other reasons. The stage 14 includes a flat plane carried on three screws 15 which serve to adjust the position of the top plane of the stage 14 relative to the top surface of the block 9.

In operation, the object is placed on the stage 14 and examined in this, first, position. The thimble 2 is rotated across one horizontal division of the sleeve 3 which equals $\frac{1}{20,000}$ of an inch. This causes the spindle to move forward $\frac{1}{20,000}$ of an inch. This causes the leg 17 to move toward 21 a distance of $\frac{1}{20,000,000}$ of an inch. Since the arm 6 can have the pivot so positioned at 7 that there is a difference of length of the arm portions on each side of the pivot, if the leg 17 is, for example, ten times longer than the leg 18, a motion of $\frac{1}{20,000,000}$ inch of the leg 17 is reduced to $\frac{1}{200,000,000}$ of an inch at leg 18 so that the block 9 is rotated about the pivot 11 a distance which becomes smaller circumferentially at any point near the center or the pivot point 11 of block 9. If the outer perimeter of object 12 is about, for example, $\frac{1}{10}$ inch from the center and the leg 18 moves $\frac{1}{200,000,000}$ inch, a point on the perimeter of object 12 will move one-two billionths of an inch. If a reflecting mirror is mounted on face 19, or face 19 is rendered reflecting a collimated beam of light striking the reflecting surface of face 19 or the surface of the mirror can be reflected by projection on a reticular scale so that the minute motion of the block can be made visible on a reticle.

Obviously, the arm 6 serves to amplify the precision of the translatory movement of the conical spindle 5. For most applications, however, it may be omitted and the conical spindle moved directly in contact with a corner edge 24 of the block 9 to impart rotation of the block 9 about its pivot 11.

Having described my invention, I claim:

1. A micrometric object translator including a stage to carry said object, a block carrying said stage, said block having at least one side perpendicular to its top surface a pivot axial to said block, a lever having a fulcrum pivot off its center dividing it into a short arm and a long arm, said short arm in contact with the perpendicular side of said block, a cone having its face in contact with said long arm of said lever, a helix connected to said cone, means for translating rotary motion of said helix into linear motion of said cone, and means for translating the linear motion of said cone into angular movement of said lever about said fulcrum pivot, and means for translating the angular movement of said lever into an angular rotation of said block about its pivot.

2. A device for generating minute translatory motion of an object including, in combination, a helix, a cone forward of said helix, a lever, a fulcrum situated off center between the ends of said lever, a solid block having a plane surface and a side perpendicular to said surface, the long end of said lever contacting said cone, means for translating rotary motion of said cone into movement of said lever about its fulcrum, and means for translating the movement of said lever into angular movement of said surface about its axial pivot, a reflecting surface on said side, whereby a collimated beam of light can be reflected from said reflecting surface to a recticular scale.

References Cited by the Examiner

UNITED STATES PATENTS

| | | | |
|---|---|---|---|
| 2,301,769 | 11/42 | Babcock | 33—214 |
| 2,556,681 | 6/51 | Davis | 33—162 X |

FOREIGN PATENTS

| | | |
|---|---|---|
| 853,208 | 10/52 | Germany. |
| 707,427 | 4/54 | Great Britain. |

ISAAC LISANN, *Primary Examiner.*